Aug. 23, 1960 R. F. SCHWEGLER 2,949,970
POSITION LOCKING MECHANISM FOR TWO-WAY PLOW
Original Filed Dec. 10, 1954 3 Sheets-Sheet 1

INVENTOR:
ROY F. SCHWEGLER
BY:

INVENTOR:
ROY F. SCHWEGLER

United States Patent Office 2,949,970
Patented Aug. 23, 1960

2,949,970

POSITION LOCKING MECHANISM FOR TWO-WAY PLOW

Roy F. Schwegler, Davenport, Iowa, assignor to J. I. Case Company, Racine, Wis., a corporation of Wisconsin Original application Dec. 10, 1954, Ser. No. 474,426, now Patent No. 2,868,307, dated Jan. 13, 1959. Divided and this application Oct. 15, 1958, Ser. No. 767,330

5 Claims. (Cl. 172—450)

This invention relates to plows, and, more particularly it relates to a two-way plow which is pivotal in plowing and stable during transport.

This application is a devision of the application of Roy F. Schwegler, Serial No. 474,426, for Two-way Plow, issued January 13, 1959, as Patent 2,868,307.

An object of this invention is to provide a plow having a novel interlocking mechanism for maintaining the plow in a selected working position.

Still another object is to provide a plow which is pivotal during plowing and stable in the raised transport position. Among other things, this provides accurate and safe plowing on hillsides providing complete control of the plow and avoiding the danger of overturning the tractor by sideward swinging of the plow when it is raised on a hillside.

Other objects and advantages will become apparent upon reading the following description in light of the accompanying drawings, wherein, Fig. 1 is a left side perspective view of a fragment of a tractor having attached thereto a preferred embodiment of a plow of this invention.

Fig. 4 is an elevational sectional view taken on the longitudinal center line of the plow showing the front end thereof.

Fig. 5 is a sectional view taken on the line 5—5 of Fig. 4, showing parts thereof in different positions with dotted lines.

Similar reference numerals refer to similar parts throughout the views.

Figure 1:
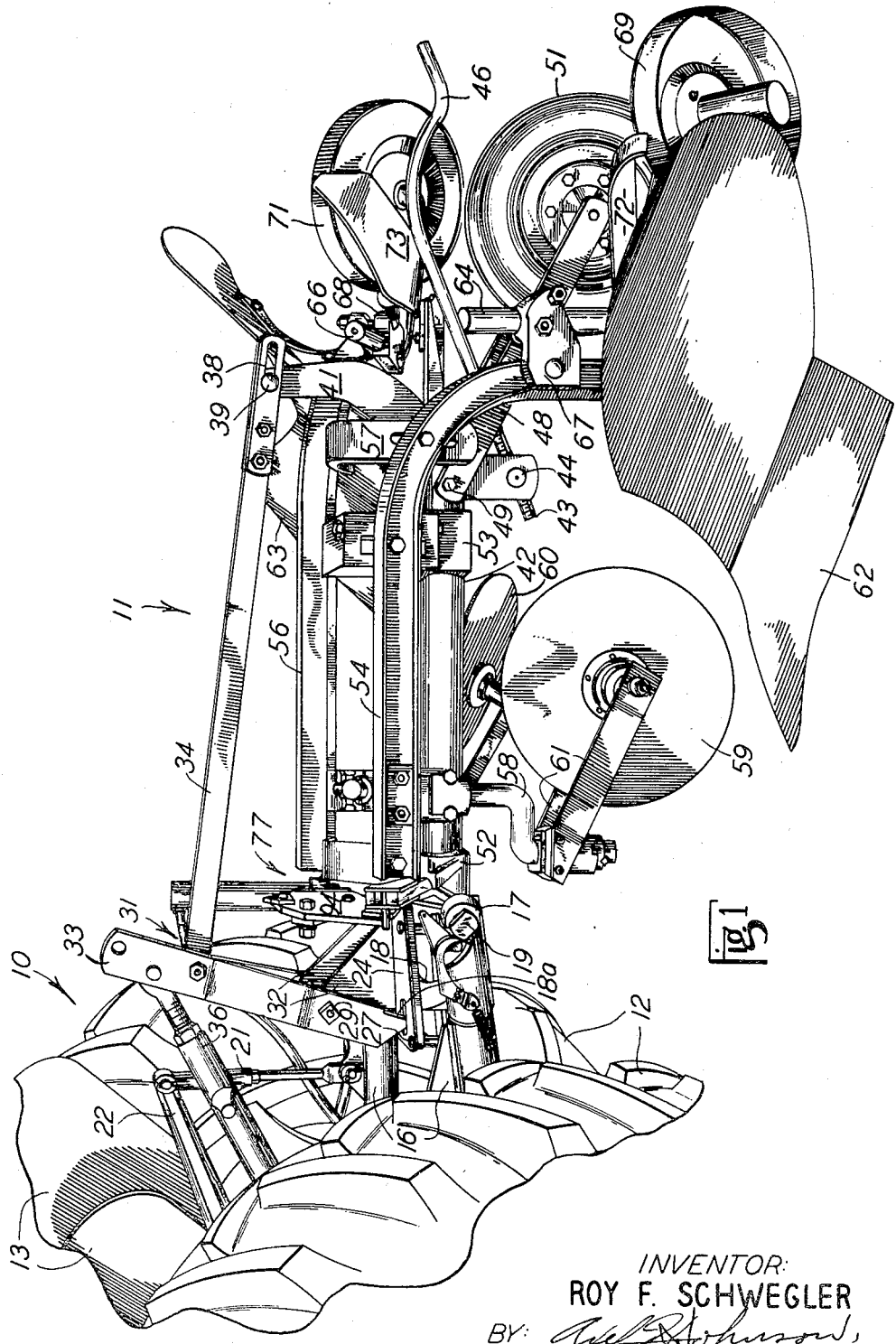
Figure 2:
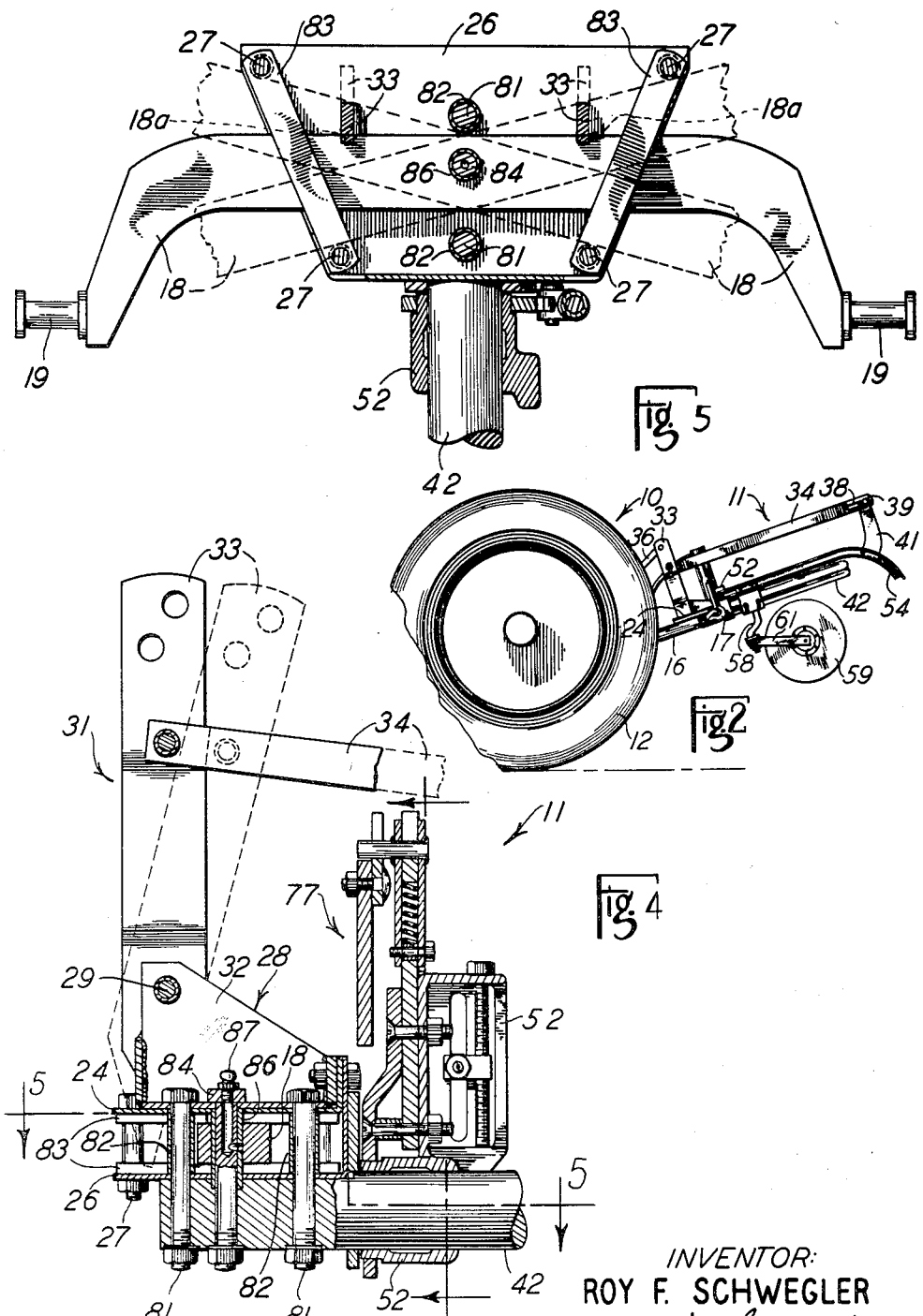
Fig. 2 is a reduced side elevation similar to that of Fig. 1 but showing only a fragment of the plow and showing it in a raised position.

Fig. 1 shows a tractor 10 with a plow 11 attached to the rear of the tractor in the usual operating position. The tractor is of a conventional construction having a pair of rear wheels 12 and corresponding fenders 13. Extending substantially horizontally rearwardly from the tractor is a pair of hitch arms, such as the arm 16 which terminates in a latch 17. Through this construction, a transverse drawbar 18 is secured to the tractor by means of two pins, such as the pin 19, engaged by the latches 17. Also, links 21 are pivotally attached to the arms 16 to extend upwardly and attach to arms 22 which are powered to pivot in a vertical plane by a hydraulic cylinder 23, Fig. 3. Thus, the arms 16 are hydraulically raised and lowered in well-known manner and the drawbar and plow are raised and lowered therewith as hereinafter described. The raised position is shown in Fig. 2.

Figure 3:
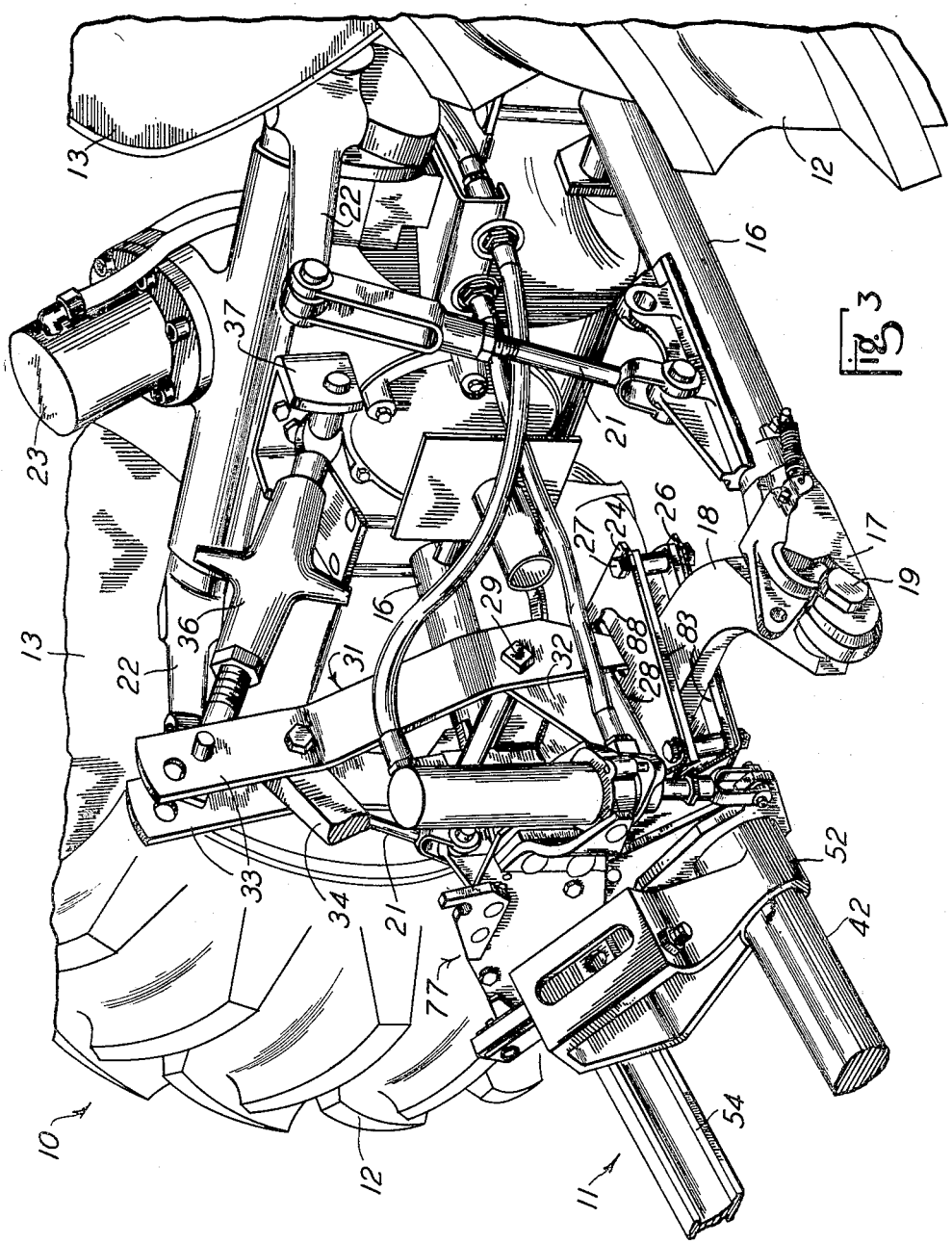
Fig. 3 is an enlarged right side prespective view of the plow shown in the previous views but with parts broken away.

Attached to the plow structure and arranged above and below the drawbar 18 is a pair of draft plates 24 and 26, Figs. 4 and 5, secured to each other by bolts 27 vertically arranged between the adjacent corners of opposite plates (see Fig. 4), bolts 27 carrying spacers of well-known type to maintain clearance between the plates for drawbar 18. In a manner more fully describer later, the plates 24 and 26 pivot horizontally on the drawbar 18 within the limits of the bolts 27 to provide for sideward swinging of the plow. A bifurcated plate 28 is suitably bolted to the top plate 24 to provide spaced apart vertical sections 32 for mounting a horizontally disposed rod 29. A mast 31 comprising a pair of upright arms 33, best seen in Fig. 3, is pivotally attached to the plates 32 at each end of the rod through engagement of upright arms 33 with rod 29, and which arms attach at their upper ends to a rearwardly extending brace 34 and to a turnbuckle 36. Both the brace 34 and the turnbuckle 36 are pivotally attached between the upper ends of the arms 33, with the turnbuckle pivotally attached to the tractor 10 through a tractor bracket 37. The rear end of the brace 34, Fig. 1 contains a slot 38 to engage a horizontally disposed pin 39 in the top of an upright arm 41 attached to the rear of the plow 11. Arm 41 is attached at its lower end to the rear end of a horizontally and longitudinally extending plow frame or axle 42. The latter is suitably attached at its front end to the draft plates 24 and 26, as described later, and is preferably circular on its exterior. A crank 46 extends below a connector not shown and threadedly engages a nut 44, said connector being pivotally mounted between a pair of arms 48 pivotally attached at 49 to the rear end of the axle 42. The opposite ends of the arms 48 rotatably receive a gage wheel 51 which rides on the unplowed ground to govern the penetration of the plow into the ground. The wheel 51 is, of course, vertically adjustable through the crank 46 to vary the amount of plow penetration.

Rotatably mounted on the front end of the axle 42, in a manner described later, is a mounting bearing 52, a bearing 53 being also rotatably mounted on the axle 42 but at the rear end thereof. Two beams 54 and 56 are bolted to the bearings 52 and 53, and they extend rearwardly on the plow 11, as shown. A curved brace 57 is bolted between the beams 54 and 56. The forward end of the beam 54 has a coulter standard 58 bolted to it to rotatably support a coulter wheel 59 attached to the standard by a pair of arms 61. The beam 56 similarly has a coulter wheel 60 attached to it so that the beams each have a coulter wheel attached to depend from the beam in the plane of the direction of movement of the plow. Also attached to the beams 54 and 56 are moldboard-type plow bottoms 62 and 63 which are preferably bolted to the trailing ends of the beams and faced away from each other. Fig. 1 also shows furrow wheel standards 64 and 66, respectively bolted to the beams 54 and 56 through brackets 67 and 68 to rotatably mount furrow wheels 69 and 71 behind the respective plow bottoms. Scrapers 72 and 73 are also preferably attached to the standards 64 and 66 to extend to the furrow wheels 69 and 71, respectively. It is to be noted that the gage wheel 51 supports the plow upwardly against the tendency of the plow bottom to dig into the ground to an excessive depth.

Through indexing mechanism 77, not important to the present invention and fully described in the parent application Serial No. 474,426, now Patent No. 2,868,307 the plow beams 54 and 56 can be rotated about the axle 42 to position either one of the plow bottoms 62 and 63 in position for plowing. Fig. 1 shows the plow bottom 62 in the plowing position with the plow bottom 63 raised out of plowing position. The gage wheel 51 is then engaged with the top of the unplowed ground in the usual and well-known manner. With this arrangement, the plow is used to form a furrow in one direction of travel. When the end of the furrow is reached, the hitch arms 16 and the mast 31 raise the plow off the ground to the position shown in Fig. 2. Then the indexing mechanism 77 is operated to rotate the plow beam 54 with its bottom 62 upwardly and the plow beam 56 with its bottom 63 downwardly to where the latter is in a ground engaging position when the plow 11 is again positioned on the ground. The tractor has then been turned around to return in the direction of the furrow but this time with the plow bottom 63 turning the furrow, but in the same direction as previously done by the bottom 62.

As shown in Figs. 3, 4 and 5, the axle 42 extends to the front of the plow 11 where bolts 81 are vertically positioned to secure plates 24 and 26 above the axle. Each bolt 81 has a spacer 82 which maintains the plates 24 and 26 apart. Also, other spacers are employed, as hereinbefore mentioned, on the bolts 27 to maintain straps 83 spaced apart within plates 24 and 26 with the straps extended between the bolts 27 in a generally fore-and-aft direction. It should be noted that the drawbar 18 is horizontally disposed between the plates 24 and 26 to permit the straps 83 to slide on the top and the bottom surfaces of the drawbar by reason of the swinging movement of the plow 11. Intermediate the bolts 81 is a pivot bolt 84, with a spacer 86, vertically disposed to project through the axle 42, and the plates, and the drawbar 18. A grease fitting 87 is preferably provided on the pivot bolt 84. Thus, it should be understood that the tractor pulls the plow 11 through the fixedly attached drawbar 18. The draft force is transmitted from the drawbar to the plow frame 42 through the pivot 84, and, therefore, the plow 11 is pivotal with respect to the tractor since the axle 42 can pivot with respect to the drawbar 18 and within the limits of the bolts 27. Fig. 5 shows the amount of pivotal movement possible in the plow frame with respect to the drawbar 18. The latter is shown fragmentarily in dotted lines in the two extreme positions of pivotal movement. Of course, the drawbar does not pivot but rather the frame pivots and the view thus shows the relative positions between them.

When the plow 11 is raised, the turnbuckle 36 pulls the mast 31 forward so that it pivots about the rod 29 to move the upper end or portion beneath pivot rod 29 toward the tractor and the mast lower end toward the drawbar 18. This action is shown in Fig. 4 wherein the dotted lines show the position of the mast in the plowing position of the plow, and the solid lines show the raised position of the plow. The upper end of the mast is, of course, confined by the turnbuckle 36 shown in Figs. 1, 2 and 3 which draws the upper end of the mast and the mast brace 34, toward the tractor as hereinbefore stated. In the action, the rear end of the brace 34 slides relatively to the arm 41 on the rear end of the plow by virtue of the brace slot 38 thus permitting substantial forward pivoting of mast 31. Fig. 5 shows the dotted position of the lower ends of the mast arms 33 and also the solid line position thereof. Since in the latter position the lower ends of the arms 33 abut the drawbar 18 on opposite sides of the pivot bolt 84, the drawbar plates are maintained in fixed relation with the drawbar and there can be no pivoting of the plow in the raised position. How this is accomplished is best shown in Fig. 3 which shows the lower ends of the mast arms 33 each projected through a slot 88 in the heretofore mentioned upper plate 24. Actually, the lower ends of the arms 33 are notched to nest with the corner of the drawbar as shown at 18ᵃ in Fig. 5. Thus it can be seen that the invention comprises a novel locking mechanism for preventing sideward swinging movement of the plow when it is in the raised position.

While specific embodiments of this invention have been shown and described, it should be obvious that certain changes could be made therein, and, therefore, this invention should be limited only by the scope of the appended claims.

I claim:

1. In a tractor conveyed pivotal plow the combination of a tractor, a transverse drawbar attached to said tractor, rearwardly thereof, power lift means on the tractor for raising and lowering said drawbar at will, a plow frame horizontally pivotally attached at its front end to said drawbar to be disposed transverse thereto, a ground tilling member attached to said frame to depend therefrom in one position into engagement with the ground, a mast attached to said frame to be pivotal thereto in a vertical plane, means attached to said tractor, said mast and said plow frame for vertically supporting said plow in a raised position of said drawbar and adapted to pivotally actuate said mast during actuation of said power-lift means, and means on said mast shiftable into engagement with said drawbar by pivoting of said mast for horizontally non-pivotally securing said frame on said drawbar when said tractor power-lift has raised said plow off the ground.

2. In a tractor mounted implement the combination of a tractor, a hitch on the tractor comprising laterally spaced links extending rearwardly from the tractor, a transversely disposed drawbar engaged with and carried by said links, an implement frame pivoted to said drawbar, centrally thereof for side-to-side swinging relatively thereto, said frame extending rearwardly of said drawbar, soil working means on said frame, a mast element extending upwardly from said frame and pivoted thereon at a point spaced above said drawbar for forward and backward swinging movement, power lift means for upward swinging of the first mentioned links for raising said implement, a third link pivoted between said mast element and said tractor, and said mast having a portion extending below its pivotal connection with said frame in position to contact said drawbar by reason of swinging of said mast as a result of upswinging of said links by operation of said power lift to secure said frame when raised against side-to-side swinging in relation to said tractor.

3. In a tractor mounted implement the combination of a tractor, a hitch on the tractor comprising laterally spaced links extending rearwardly from the tractor, a transversely disposed drawbar engaged with and carried by said links, an implement frame having a pivotal connection to said drawbar, centrally thereof for side-to-side swinging relatively thereto, said frame extending rearwardly of said drawbar, soil working means on said frame, a bifurcated mast element extending upwardly from said frame and pivoted thereon at a point spaced above said drawbar for forward and backward swinging movement, power lift means for upward swinging of the first mentioned links for raising said implement, a third link pivoted between said mast element and said tractor, and said mast having portions extending below its connection with said frame in position to contact said drawbar on either side of said pivotal connection by reason of swinging of said mast as a result of upswinging of said links by operation of said power lift to secure said frame when raised against side-to-side swinging in relation to said tractor.

4. In a tractor mounted implement the combination of a tractor, a hitch on the tractor comprising laterally spaced links extending rearwardly from the tractor, a transversely disposed drawbar engaged with and carried by said links, an implement frame pivoted to said drawbar, centrally thereof for side-to-side swinging relatively thereto, said frame extending rearwardly of said drawbar, soil working means on said frame, a mast element extending upwardly from said frame and pivoted thereon at a point spaced relatively to said drawbar for forward and backward swinging movement, power lift means for upward swinging of the first mentioned links for raising said implement, a third link pivoted between said mast element and said tractor, and said mast having a portion extending from its pivotal connection with said frame into a position to contact said drawbar by reason of swinging of said mast as a result of upswinging of said links by operation of said power lift to secure said frame to said drawbar when raised, against side-to-side swinging in relation to said tractor.

5. In a tractor mounted implement the combination of a tractor, a hitch on the tractor comprising laterally spaced links extending rearwardly from the tractor, a transversely disposed drawbar engaged with and carried by said links, an implement frame pivoted to said drawbar, centrally thereof for side-to-side swinging relatively thereto, said frame extending rearwardly of said drawbar, soil working means on said frame, a mast element extending upwardly from said frame and pivoted thereon at a point spaced above said drawbar for forward and backward swinging movement, power lift means for upward swinging of the first mentioned links for raising said implement, a third link pivoted between said mast element and said tractor, a lost motion connection from said mast rearwardly to said frame for lifting the same upon actuation of said power lift and said mast having a portion extending below its pivotal connection with said frame in position to contact said drawbar by reason of swinging of said mast within the limits of said lost motion connection as a result of upswinging of said links by operation of said power lift, to secure said frame when raised against side-to-side swinging in relation to said tractor.

References Cited in the file of this patent
UNITED STATES PATENTS 2,713,297   Tsuchiya ---------------- July 19, 1955